United States Patent [19]

Pinnavaia et al.

[11] Patent Number: 5,126,300
[45] Date of Patent: Jun. 30, 1992

[54] CLAY COMPOSITES FOR THE REMOVAL OF $SO_x$ FROM FLUE GAS STREAMS

[75] Inventors: Thomas J. Pinnavaia, East Lansing; Christine A. Polansky, Ithaca; Jayantha Amarasekera, East Lansing, all of Mich.

[73] Assignee: Board of Trustees operating Michigan State University, East Lansing, Mich.

[21] Appl. No.: 719,987

[22] Filed: Jun. 24, 1991

Related U.S. Application Data

[63] Continuation-in-part of Ser. No. 553,254, Jul. 16, 1990.

[51] Int. Cl.$^5$ .............................................. B01J 21/16
[52] U.S. Cl. ...................................................... 502/84
[58] Field of Search ........................................... 502/84

[56] References Cited

U.S. PATENT DOCUMENTS

| | | | |
|---|---|---|---|
| 1,346,349 | 7/1920 | Tate | 502/84 |
| 1,657,440 | 1/1928 | Fryer | 502/84 |
| 2,352,932 | 7/1944 | Barrett et al. | 502/84 |
| 4,316,813 | 2/1982 | Voss | 502/84 |
| 4,731,233 | 3/1988 | Thompson et al. | 423/231 |
| 4,904,627 | 2/1990 | Bhattacharyya | 502/84 |
| 4,981,825 | 1/1991 | Pinnavai et al. | 502/63 |

OTHER PUBLICATIONS

Josewicz et al., React. Solids, 6; 243 (1988).
B. K. Gullett et al., React Solids, 3; 337 (1987).
B. K. Gullett et al., React. Solids, 6; 263 (1988).
Chang E. Y., et al., AIChE J., 30; 450 (1984).
Thibault, J. D., et al., Can. J. Eng., 60; 796 (1982).
Chang, J. C. S., et al., Envir. Prog., 3; 267 (1984).
Fuller, E. L., et al., Langmuir, 3; 753 (1987).
Jozewicz, W., et al., JAPCA, 38; 796 (1988).
Jozewicz, W., et al. EPA/600; D-87/095, (NTIS PB87-175857/AS).
Jozewicz, W., et al., EPA/600/D-87/135, (NTIS PB87-182663).
Chang et al., "Fossil Fuels Utilization:Environmental Concerns" Eds. R. Markuszewski, B. Blaustein, Chap. 15.
"Crystal Structures of Clay Minerals and Their X-ray Identification" Eds. Brindley et al., Chap. 1 and 3.
Laszlo, P., Science, 235; 1473 (1987).

*Primary Examiner*—Carl F. Dees
*Attorney, Agent, or Firm*—Ian C. McLeod

[57] ABSTRACT

A method for preparing smectite clay alkaline earth metal hydroxide and carbonate composite materials is described. The method uses low amounts of the clay added to water to which is added calcium oxide or calcium hydroxide. Optionally the calcium carbonate is formed in situ by exposure to air or to carbon dioxide in the solution. The product is dried to form the composite material which is used to remove $SO_x$ from flue gases.

18 Claims, No Drawings

CLAY COMPOSITES FOR THE REMOVAL OF SO$_x$ FROM FLUE GAS STREAMS

CROSS-REFERENCE TO RELATED APPLICATION

This application is a continuation-in-part of U.S. application Ser. No. 07/553,254, filed Jul. 16, 1990.

BACKGROUND OF THE INVENTION (1) Field of the Invention

This invention relates to the use of smectite clay composites containing alkaline earth metal hydroxides and carbonates for the removal of SO$_x$, (sulfur dioxide and sulfur trioxide), from flue gases, particularly flue gas from coal burning power plants, and to the method of preparing them.

(2) Prior Art

The first example of flue gas scrubbing for sulfur dioxide control occurred in London, England, in 1933. However, the application of this technology to coal-fired utility boilers in the United States did not begin until the 1970's. The first large-scale application of flue gas scrubbing using lime or limestone was installed in 1964, in the Soviet Union. This facility was followed by an installation at a large sulfuric acid plant in Japan in 1966. In 1970, the Clean Air Act Amendments were adopted. This legislation provided for enforcement, by the United States Environmental Protection Agency (EPA), of SO$_x$ emissions limits for power plants constructed or modified after Aug. 17, 1971. This Act spurred extensive flue gas desulfurization (FGD) research. As of Jan. 1984, calcium based, wet, throwaway systems (including lime, limestone, and alkaline-ash systems) accounted for 84 percent of existing and planned FGD capacity. The Clean Air Act was amended in 1977 to require further control of SO$_x$ emissions. Increasing federal regulations and the high cost to construct and operate existing wet FGD units have encouraged continued research on new or modified flue gas cleanup processes.

Controlling the emissions of SO$_x$ from power plants is a world-wide problem due to its relationship to "acid rain". Therefore, research into its control is a global effort. Example of a recent patent using calcium based systems to reduce SO$_x$ emissions is Thompson and Nuzio, U.S. Pat. No. 4,731,233. In most cases a commercial source of limestone or lime is used due to cost effectiveness and available quantities.

There are a number of ways to control SO$_x$ emissions in existing power plants or features that can be included in construction of new power plants. These approaches can be classified according to the position in the combustion system at which pollutant control technology is applied. Precombustion control involves removal of sulfur, nitrogen and ash compounds from the fuel before it is burned. In most cases this involves application of coal-cleaning technology. Combustion control includes staged combustion, boiler limestone injection, and fluidized-bed combustion with limestone addition. Postcombustion control involves removal of pollutants after they have been formed but before they are released into the atmosphere. This would include in-duct dry sorbent injection, induct spray drying and combined electrostatic precipitator (ESP)/fabric filter sorbent injection (Jozewicz, W., Chang, J. C. S., Sedman, C. B. and Brna, T. G., React. Solids, 6 243 (1988)).

U.S. Pat. No. 4,981,825 to Pinnavaia and Moini, describes the use of smectite clays mixed with metal oxide sol particles to prevent sintering of the clays when heated to elevated temperatures. This method is more complicated than necessary with calcium hydroxide, calcium oxide or other metal oxides which are reactive with SO$_x$.

Flue gas treatment systems can be classified as either wet or dry based on the moisture content of the treated flue gas and the spent sorbent. Wet systems completely saturate the flue gas with water vapor. The flue gas is contacted with a liquid or slurry stream. Dry systems contact the flue gas with a dry or wet sorbent but never include enough water for complete saturation of the flue gas. Dry systems result in a dry product or spent sorbent material, while wet systems results in either a slurry or a sludge.

Although calcium based systems are the major source of SO$_x$ control, they are not without problems. Agglomeration of particles can be a serious problem that results in a less than optimal conversion to CaSO$_x$, (CaSO$_3$ and CaSO$_4$). The activity of the calcium species decreases as its particle size increases. Also CaSO$_x$ occupies more volume than CaO, the common active species. Therefore, an increase in volume occurs as the reaction proceeds, which causes a loss in the original porous character of the CaO. This results in a blockage of SO$_x$ and O$_2$ to the active CaO centers (Gullett, B. K. and Blom, J. A., React Solids, 3 337 (1987); Gullett, B. K., Blom, J. A. and Cunningham, R. T., React. Solids, 6 263 (1988); Chang, E. Y. and Thodes, G., AIChE J., 30 450 (1984); Thibault, J. D., Steward, F. R. and Ruthven, D. M., Can. J. Chem. Eng., 60 796 (1982)).

Prior Art in this field has used limestone, lime or hydrated lime as a precursor for the active CaO species or has used Ca(OH)$_2$ as the active species. Generally, the active species has been used as a bulk phase and not as a dispersed species (Chang, J. C. S. and Kaplan, N., Envir. Prog., 3 267 (1984); Gullett, B. K., Blom, J. A. and Cunningham, R. T., React. Solids, 6 263 (1988); Chang, E. Y. and Thodes, G., AIChE J., 30 450 (1984); Fuller, E. L. and Yoos, T. R., Langmuir, 3 753 (1987)). Recent work has concentrated on the addition of fly ash to Ca(OH)$_2$ to enhance its activity in SO$_x$ control (Jozewicz, W. and Rochelle, G. T., Envir. Prog, 5 219 (1986); Jozewicz, W., Chang, J. C. S., Sedman, C. B. and Brna, T. G., JAPCA, 38 796 (1988); Jozewicz, W., Chang, J. C. S., Sedman, C. B. and Brna, T. G., React. Solids, 6 243 (1988); Jozewicz, W., Chang, J. C. S., Sedman, C. B. and Brna, T. G., EPA/600;D-87/095, (NTIS PB87-175857/AS); Jozewicz, W., Chang, J. C. S., Sedman, C. B. and Brna, T. G., EPA/600/D-87/135, (NTIS PB87-182663). The fly ash is a siliceous material and formation of various calcium silicates can occur. Several diatomaceous earths, montmorillonite clays and kaolins have also been identified as containing reactive silica (Jozewicz, W., Chang, J. C. S., Sedman, C. B. and Brna, T. G., React. Solids, 6 243 (1988)).

Conventional systems use limestone, lime, or hydrated lime as a precursor for the reactive CaO species or have used Ca(OH)$_2$ as the reactive species. Agglomeration of particles is a serious problem that results in less than optimal conversion to CaSO$_x$ for all of these systems. The activity of the calcium species decreases as its particle size increases. This is caused by the larger volume that CaSO$_x$ occupies compared to CaO, the common active species. An increase in volume occurs as the reaction proceeds, which causes a loss in the original porous character of the CaO. This results in a blockage of $SO_x$ and $O_2$ resulting in inefficient removal of $SO_x$ from flue gas streams (Gullett, B. K. and Blom, J. A., React. Solids, 3 337 (1987); Gullett, B. K., Blom, J. A. and Cunningham, R. T., React. Solids, 6 263 (1988); Chang, E. Y. and Thodes, G., AIChE J., 30 450 (1984); Thibault, J. D., Steward, F. R. and Ruthven, D. M., Can. J. Chem. Eng., 60 796 (1982)).

OBJECTS

Therefore, an object of the present invention is to provide an improved synthesis of alkaline earth metal carbonate or alkaline earth metal hydroxide containing clay composites which are suitable for removing $SO_x$ components from flue gas streams. In the preferred improved process, lime is used as the precursor base component along with smectite type clays, which is then converted into slaked lime ($Ca(OH)_2$) in water or to $CaCO_3$ in the presence of carbon dioxide, rather than by introducing the $CaCO_3$ directly into the clays.

Another object of the present invention is to provide highly reactive basic sorbent compositions for the removal of $SO_x$ components from flue gas streams, especially from coal burning power plants. The smectite type clays serves as a support for the reactive base, as a dispersing agent for improved reactivities of the base components towards $SO_x$, and when structural iron ions are present, as a catalyst for oxidation of $SO_x$ to $SO_3$, which is more reactive toward the supported base.

GENERAL DESCRIPTION

The present invention relates to a method for preparing a composite material useful for $SO_x$ removal from the flue gas of a coal-burning power plant and other gas streams which comprises: providing a suspension of a smectite clay containing 0.1 to 5% by weight of clay in water; adding a basic material selected from the group consisting of alkaline earth metal oxides and hydroxides to the clay suspension to provide a resulting suspension; mixing the resulting suspension; recovering a precipitate from the resulting suspension; and drying the precipitate at a temperature between 100°-120° C. to provide the composite material, wherein when the composite material is heated to a temperature of 500° C. or above, the $SO_x$ components from a gas stream are removed by the composite material upon contacting with the said gas stream at that temperature.

The present invention also relates to a method for preparing a composite material useful for $SO_x$ removal from the flue gas of a coal-burning power plant and other gas steams which comprises: providing a suspension of a smectite clay containing 0.1 to 5% by weight of clay in water; adding a basic material selected from the group consisting of alkaline earth metal oxides and hydroxides to the clay suspension to provide a resulting suspension; mixing the resulting suspension by stirring with $CO_2$ gas present in water to convert at least some of the basic material to alkali metal carbonate; recovering a precipitate from the resulting suspension; and drying the precipitate in air at ambient temperatures to provide the composite material, wherein when the composite material is heated to a temperature of 500° C. or above, the $SO_x$ components from a gas stream are removed by the composite material upon contacting with the said gas stream at that temperature.

The present invention further relates to a method for preparing a composite material useful for $SO_x$ removal from the flue gas of a coal-burning power plant and other gas streams which comprises: providing a suspension of a smectite clay containing 0.1 to 5% by weight of clay in water; adding a basic material selected from the group consisting of alkaline earth metal oxides and hydroxides to the clay suspension as a resulting suspension; mixing the resulting suspension by stirring while bubbling $CO_2$ gas through the suspension to convert at least some of the basic material to alkali metal carbonate in the resulting suspension; recovering a precipitate from the water by filtration or by centrifugation; and drying the precipitate in air at ambient temperatures or in an oven at 110° C. to provide the composite material, wherein when the composite material is heated to a temperature of 500° C. or above, the $SO_x$ components from a gas stream are removed by the composite material upon contacting with the said gas stream at that temperature.

Further, the present invention relates to a method for removing $SO_x$ from a gas mixture which comprises: providing a dry physical mixture of a basic material selected from the group consisting of an alkali metal oxide and an alkali metal hydroxide and a smectite clay; mixing the dry physical mixture to insure homogeneity of the mixture; adding a minimum amount of water to the dry physical mixture to make a paste; blending the paste in a carbon dioxide atmosphere to promote the formation of an alkali metal carbonate from the basic material; drying the paste at a temperature up to about 110° C. to provide the composite material, wherein when the composite material is heated to a temperature of 500° C. or above, the $SO_x$ components from a gas stream are removed by the composite material upon contacting with the said gas stream at that temperature.

Our application Ser. No. 07/553,254 describes clay-composite materials useful for removing $SO_x$ from a gas stream. In this patent application, alkali and alkaline earth oxides or carbonates such as $NaHCO_3$ and $CaCO_3$ were precipitated in the presence of smectite clay suspensions from respective salts or was impregnated onto clay using water soluble compounds. When these composite materials are heated to at least 500° C. the $SO_x$ is removed from the gas streams by the basic compound.

In accordance with one method of the previous invention, a 0.5 to 1.5 weight percent, wt. %, aqueous suspension of clay was initially prepared. An aqueous solution of $Na_2CO_3$ was added dropwise to the clay suspension while it was stirred. This was followed by a similar addition of $CaCl_2 \cdot 2H_2O$. The addition of the calcium species caused the precipitation of $CaCO_3$. The amount of $Na_2CO_3$ and $CaCl_2 \cdot 2H_2O$ was varied to provide the desired weight ratio of $CaCO_3$ to clay. The product was washed with deionized distilled water, either by centrifugation/decantation or by dialysis, to remove the excess chloride and sodium ions before drying. Washing the preparation was preferred, because reactivity with $SO_x$ was diminished if no attempt was made to remove the chloride. The adverse effect of chloride on $SO_x$ removal has also been verified by another study which evaluated the effects of magnesium and chloride ions on the performance of limestone-regenerated dual alkali processes under closed-loop operating conditions (Chang, J. C. S., Kaplan, N. and Brna, T. G. in "Fossil Fuels Utilization: Environmental Concerns" (Eds. R. Markuszewski, B. Blaustein) Chap. 15). Limestone reactivity decreased with the increase of chloride ion concentration. The effect was especially pronounced after a concentration of 80,000 ppm was reached. The base-clay composites were thus, thoroughly washed by employing several wash cycles.

One difficulty with this earlier process of making base-clay composites is this extensive washing procedure involved during the synthesis to remove chloride ions. In an industrial scale preparation, this would not be economically feasible.

The composites of the present invention are base-smectite clay composites. The present invention provides a method wherein composite materials of highly dispersed bases are provided on clay supports. This results in decrease of agglomeration of base particles (e.g. CaO, Ca(OH)$_2$ or CaCO$_3$), and in an increase in the optimal conversion to CaSO$_x$ that can be achieved.

The common bases employed are CaO, Ca(OH)$_2$ and CaCO$_3$ but are not exclusive to these. Other base materials are magnesium oxide, magnesium carbonate, magnesium hydroxide, zinc oxide, zinc carbonate, zinc hydroxide, aluminum oxide, and aluminum hydroxide. The base can be derived from any alkaline earth metal salt such as magnesium or from any alkali metal salt, including those of sodium, lithium, potassium, and the like.

The clays utilized in this invention are members of the smectite group of hydrous 2:1 layer lattice silicates containing two-dimensional tetrahedral sheets of composition T$_2$O$_5$ (T=tetrahedral cation, i.e. Si$^{4+}$, Al$^{3+}$, or Fe$^{3+}$), in which individual tetrahedra are linked with neighboring tetrahedra by sharing three corners each (the basal oxygens) to form an hexagonal mesh pattern. The fourth tetrahedral corner (the apical oxygen) points in a direction normal to the sheet and at the same time forms part of the immediately adjacent octahedral sheet in which individual octahedra are linked laterally by sharing octahedral edges. The octahedral cations are usually Mg$^{2+}$, Al$^{3+}$, Fe$^{2+}$, and Fe$^{3+}$, but other medium-sized cations also occur in some species. The presence of iron in the clay can be beneficial at SO$_2$ uptake temperatures of 700° C. or less, since iron centers catalyze the oxidation of SO$_2$ to more reactive SO$_3$ in this temperature range.

The smallest structural unit of a smectite clay contains three octahedra. If all three octahedra are occupied, the sheet is classified as trioctahedral. If only two octahedra are occupied and the third octahedron is vacant, the sheet is classified as dioctahedral. The assemblage formed by linking two-tetrahedral sheets with one octahedral sheet is known as a 2:1 layer. The linkage is achieved by inverting the upper tetrahedral sheet so that its apical oxygens point down and can be shared by the octahedral sheet below. Both octahedral anion planes then are of the same O, OH composition. If the 2:1 layers are not electrostatically neutral, the excess layer charge is neutralized by various interlayer materials, including individual cations, and hydroxide octahedral groups and sheets ("Crystal Structures of Clay Minerals and Their X-ray Identification" (Eds. Brindley, G. W. and Brown, G.) Chap. 1.)

Smectites are a type of 2:1 layered silicates. General formulas for di- and trioctahedral smectites are as follows:

dioctahedral
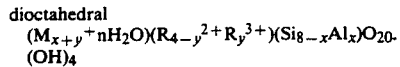

trioctahedral
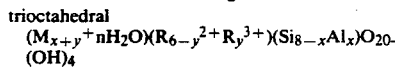

per unit cell. These 2:1 layered silicates have an electron charge/unit cell between 0.4 and 1.2. Montmorillonite is the most common smectite and refers to the dioctahedral Al, Mg smectite with the layer charge arising mainly from the Mg-for-Al substitutions in the octahedral position, i.e. (M$_y$$^+$nH$_2$O)(Al$_{4-y}$Mg$_y$)Si$_8$O$_{20}$(OH)$_4$ per unit cell. Montmorillonites generally have total specific surface areas of the order of 500–850 m$^2$/g, which includes both the interlayer and eternal surface area ("Crystal structures of Clay Minerals and Their X-ray Identification" (Eds. Brindley, G. W. and Brown, G.) Chap. 8, and Laszlo, P. Science, 235 1473 (1987)).

Smectite clays also have the ability to swell in water. The swelling ability of the clay depends upon whether a monovalent or divalent cation is used to neutralize the clay layers. Monovalent ions tend to remain more or less associated with the silicate layers when hydration occurs but divalent ions tend to move into the water layers. Thus, the silicate layers and their associated monovalent ions behave in a similar manner to neutral entities with the layers becoming fully dispersed in water. Divalent ion clays appear to be dispersesd in small packets generally compromising 4–5 layers. Divalent ions link pairs of layers together by satisfying two negative charges in a manner which monovalent ions cannot.

The formation of a highly dispersed clay suspension facilitates a uniform dispersion of the base particles during preparation of the base/clay composite. The dispersed base of the composite material possesses a different dispersion than the bulk base. The greater dispersion of the base particles in the composite is conducive to the reaction of the base with SO$_x$ resulting in a more efficient use of the available base. An improvement in SO$_x$ reactivity has been observed with composites containing only small amounts of clay. A ratio of 9:1 base to clay still results in improved uptake over conventional bulk base systems.

The present invention provides methods for the production of composite materials consisting of alkaline earth metal bases and smectite clay composites of varying alkaline earth metal base to clay ratios than has heretofore been known in the prior art, especially, and most preferably, by causing the formation of Ca(OH)$_2$ or CaCO$_3$ from CaO onto and between clay particles while the dispersed clay is in aqueous suspension. The resulting composite materials are suitable for removing SO$_x$ from the flue gas of coal burning power plants and other gas streams.

SPECIFIC DESCRIPTION

In the first method disclosed in this invention, a suspension of lime (CaO) in water is added to a stirred suspension of smectite clay in water. Alternatively, CaO can be added as a solid into the stirred clay slurry. The action of water on CaO results in the formation of Ca(OH)$_2$ in essentially quantitative yields, as judged by x-ray powder diffraction. The stirring procedure is carried out to facilitate the proper dispersion of basic Ca(OH)$_2$ particles onto the smectite clay platelets. The composite thus obtained is recovered either by filtration or by centrifugation and dried in air or in an oven at 110° C. to isolate the dry composite material.

Two preferred forms of smectite clays have been employed in this invention, namely, Na-montmorillonite from Crook County, Wyo., USA and Ca-montmorillonite from Apache County, Ariz., USA. The type of smectite clay is, however, not limited to montmorillonites. Other types of smectites such as hectorite, fluorohectorite, saponite, bentonite, beidellite, nontronite, and the like also serve as good supports to dispersed base particles in the composites.

It is important that clay suspension contains less than 5% w/w clay. At higher concentrations these slurries tend to form gels and thus making the subsequent mixing process with CaO base difficult. It is more preferred that the clay slurries contain between 1-2% w/w clay. At these lower concentrations the dispersion of base particles within clay is much more efficient and results in formation of composites with very highly dispersed base particles.

The amount of CaO used depends on the sorbent/clay ratio desired. Different ratios of CaO to clay were tested. Particularly good $SO_x$ reactivities were observed when calcium containing base to clay ratio is between 1:1 to 10:1.

Instead of CaO as the base precursor, one may use $Ca(OH)_2$ or $CaCO_3$ in preparing these clay-base composites. Accordingly, in another preferred method of the present invention, the preparation of $Ca(OH)_2$-clay composite is accomplished using $Ca(OH)_2$ from Columbus, Ohio. The base-clay composite isolated showed reactivities towards $SO_x$ comparable to the composites prepared using CaO as a precursor.

The reaction of CaO/clay mixture with water converts CaO to $Ca(OH)_2$ during the preparation of the above the clay-containing composites. X-ray powder diffraction (XRPD) data on these solid composites indicate that some or all of the $Ca(OH)_2$ thus formed can be converted to calcium carbonate when the composite is exposed to carbon dioxide. Composites prepared directly from $Ca(OH)_2$ and clay suspensions also behave in this manner when exposed to $CO_2$. Even the $CO_2$ in the ambient atmosphere is sufficient to convert some $Ca(OH)_2$ to $CaCO_3$. However, by minimizing the exposure of the wet composites to $CO_2$ by drying quickly in an oven at 110° C., one can largely avoid the $CaCO_3$ formation. The composites isolated in this manner were rich in $Ca(OH)_2$. On the other hand, by exposing the wet $Ca(OH)_2$/clay composites to an atmosphere rich in $CO_2$, one can prepare a clay composite containing calcium largely in the form of $CaCO_3$. The composites which are rich in $CaCO_3$ showed better reactivities towards $SO_x$.

The present invention particularly relates to a method for preparing these clay composite materials that are rich in $CaCO_3$, which are suitable for removing $SO_x$ from a flue gas and other gas streams, by adding CaO or $Ca(OH)_2$ as solids or as suspension in water to a smectite clay suspension in water. The resulting slurry is treated with a stream of $CO_2$ gas. XRPD studies of the products isolated showed that the conversion of CaO or $Ca(OH)_2$ to $CaCO_3$ was completed after about 30 minutes to 1 hour, depending on the amounts of materials being treated. The products are isolated as before and either dried in air or in an oven at 110° C. Instead of purging $CO_2$ gas through these slurries, one may stir these slurries in air for longer periods of time to provide ample time to convert $Ca(OH)_2$ in the slurries to $CaCO_3$ from atmospheric $CO_2$.

Another preferred method of the present invention provides a composite material for $SO_x$ removal from flue gas by starting with a dry physical mixture of CaO or $Ca(OH)_2$ and clay. The dry physical mixture is prepared by any suitable blending procedure such as ball milling, grinding, and the like. A paste then is prepared from the blended powder by using the minimum amount of water to thoroughly wet the sample. Carbon dioxide gas, $CO_2$, is blended into the paste to form the $CaCO_3$/clay composite. The paste is dried in air at 25° to 100° C. Composites prepared by this method are superior to dry physical mixtures of CaO or $Ca(OH)_2$ and clay towards the reactivity with $SO_2$. Also, the composites prepared in this manner, require minimum amounts of water. Thus, the paste formation is a convenient route to producing $CaCO_3$-containing clay composites, especially on an industrial scale. The paste formed can be extruded easily to any shape and size before drying. The dry composites isolated can be introduced at different stages in the coal-burning power plants.

These methods developed in this invention result in the formation of $Ca(OH)_2$ and/or $CaCO_3$ clay composites without the use of a soluble base or a soluble base precursor. Further, the methods disclosed here do not require time consuming steps of washing the ($Ca(OH)_2$ and/or $CaCO_3$)/clay composites to remove excess sodium and chloride ions. Therefore, the methods described in this patent are the preferred ones for the formation of $Ca(OH)_2$/clay composites, $CaCO_3$/clay composites, or mixed $Ca(OH)_2$ and $CaCO_3$/clay composites of varying ratios, which are used to remove $SO_x$ from flue gas of coal-burning power plants In preparing these base/clay composites, lime is the preferred base precursor, since it can be easily converted to highly reactive $Ca(OH)_2$ in the presence of aqueous clay slurries or to $CaCO_3$ by exposing to $CO_2$ gas. The addition of carbon dioxide has the added advantage of further reducing the particle size of these composites and enhancing the $SO_x$ reactivities. Moreover, base precursors, such as $CaCO_3$ and $Ca(OH)_2$ can be obtained starting with soluble calcium salts such as calcium chloride, calcium nitrate, calcium acetate, calcium oxalate, etc., and a suitable water soluble hydroxides such as sodium hydroxide, ammonium hydroxide or a carbonate such as sodium carbonate, etc. Furthermore, the base used in this invention is not limited to calcium salts.

The composites disclosed in this invention show very good rectivities towards $SO_2$ at temperatures above 500° C. Thus, these composites can be pre-calcined at or above 500° C. before introducing to the coal-burning power plants. Drying and calcination can take place simultaneously when the sorbents are directly injected into the combustor.

There are several advantages of using smectite clays in these clay/base composites. The presence of highly swellable smectite clay allow the base particles to disperse on clay particles in water, thus helping to minimize aggregation and sintering of the base particles. As a result, the composites show high $SO_x$ reactivities. The methods disclosed here for the formation of base/clay composites provide materials superior to those prepared by a dry physical mixture of CaO or $Ca(OH)_2$ and clay. For instance, a fifty percent increase in $SO_2$ reactivity was observed when the wet method of preparation from $Ca(OH)_2$ was used to form the $CaCO_3$/clay composite. Even greater increase in $SO_2$ reactivity were observed when the wet method of preparation from CaO was used to form the $CaCO_3$/clay composites.

Furthermore, the presence of clay make these composite particles rigid and less fragile than the particles of base in the absence of the clay component. This allows easy processing of the composite to any form of particles differing sizes or shapes. The $Ca(OH)_2$ formed from the slaking of lime and the $CaCO_3$ formed from the carbonation of lime or slaked lime exist as fine particles and show enhanced $SO_x$ reactivities than unprocessed lime. In practice, however, it is difficult to collect these products via normal filtration processes due to their fine particulate nature. In the presence of smectite clays, as described in this invention, the hydration and carbonation processes in the presence of smectite clay give composites that are easily filterable. In other words, clay greatly facilitates the filtering process, particularly when the particles of $Ca(OH)_2$ and $CaCO_3$ are small and especially reactive towards $SO_x$.

The composites prepared according to the present invention have a ceramic texture suitable for withstanding attrition. Thus, in a coal-fired boiler application, the present sorbents may be injected to the combustion zone, (e.g., the boiler, temp. 700°–1000° C.) when combustion takes place, or added with coal. Sorbents then leave the combustion zone with coal ash and can be removed from the bag house. This process in turn, provides enough contact time for the sorbents to react with $SO_x$ from the flue gas streams. Thus the flue gas leaving the combustion zone/contacting zone systems have reduced amounts of sulfur oxide relative to the processing in the absence of present sorbents. Due to the presence of the clay support, the reacted sorbents also have the ceramic texture, which is ideal for the safe deposition without any serious environmental pollution.

· In a broader sense this invention considers the use of these clay composites in controlling the sulfur oxides from gas streams, more particularly from coal-fired boiler systems. These systems include a boiler, economizer and dust collectors such as electrostatic precipitator or bag filter house ("bag house"). The injection of the sorbents into these, particularly to the boiler (700°–1000° C.), along with coal has been considered in this invention.

The clay composites prepared as described above, were thermally treated in a temperature programmed thermogravimetric balance at a temperature range of 500°–1000° C. in a stream of air, and $SO_2$ gas was introduced. The amount of $SO_2$ reacted with the sorbents was monitored as the weight uptake. Heating the composites to 900° C. converts the $Ca(OH)_2$ or $CaCO_3$ component to form CaO. Exposing the heated composite to $SO_x$ in a gas stream containing some oxygen converts the CaO rapidly to $CaSO_4$. However, in a particular application it is not necessary to pre-calcine the composite before exposing the composite to the $SO_x$ stream.

The reactivities of representative clay-base composites with $SO_2$ at 900° C. are given in the following Examples and Table 1 following the Examples. All these composites show higher reactivities with $SO_2$ that are substantially greater than pure CaO, or CaO derived from the thermal decomposition of $Ca(OH)_2$ or $CaCO_3$. For example, the $CaCO_3/Ca^{2+}$-montmorillonite composite formed by reacting a 5:1, CaO:Ca-montmorillonite with $CO_2$ (8.9:1 as $CaCO_3$:Ca-montmorillonite) resulted in a conversion of 74.2% of Ca sites in the composite to $CaSO_4$ when the material is exposed 0.5% v/v $SO_2$ in a stream of air (200 ml/min) for one hour. During the first 5 minute period 58.9% of the Ca sites were converted to $CaSO_4$. The excellent reactivity makes this composite an attractive one for the removal of $SO_x$ from coal-burning power plants. Comparable reactivities were also observed for other clay composites containing different $CaCO_3$/clay ratios (Table 1). A series of related composites were prepared by changing the precursor base from CaO to $Ca(OH)_2$ or by changing the type of clay from Ca-montmorillonite to Na-montmorillonite. All these composites show very good reactivities towards $SO_x$ (Table 1).

EXAMPLES 1 to 3

The preparation of $CaCO_3$/Ca-montmorillonite composites of different $CaCO_3$:clay ratios are described in this example. The carbon dioxide gas from air or from the water present in the reaction mixture is allowed to react with base component to form $CaCO_3$.

Ca-montmorillonite (Cheto) from Apache County, Ariz., USA was selected as the representative member of the smectite family of 2:1 layer lattice silicates. A 1.8 weight percent, wt. %, of clay was dispersed in deionized distilled water. An upper limit of 2 micron particle size was achieved by sedimentation in water and application of Stokes law of settling under gravity. The procedure was performed twice to optimize clay purity. Sedimentation also removed quartz and other insoluble impurities that may have been present in the clay. After purification, the clay was air dried on a glass plate or stored in an aqueous suspension. In a large scale application, it would not be necessary to purify the clay starting material, instead, the clay ore could be used directly.

The preparation of $CaCO_3$:Ca-montmorillonite 5.4:1 (w/w) ratio is described below.

The desired weight ratio, 5.4:1 of precipitated $CaCO_3$:Ca-montmorillonite was achieved by using 3 parts of lime, CaO to one part of clay. A 0.75 g of pulverized CaO from Mississippi Lime Company, Ste. Genevieve, Mo. was added slowly to a 100 ml of deionized distilled water while stirring in the open atmosphere for reaction with ambient $CO_2$. A 100-ml portion of 0.25 wt. % suspension of Ca-montmorillonite in deionized distilled water was added to the first solution while stirring. The precipitate was air dried at ambient temperature. An XRPD pattern of the product showed a reflection at 5.8° (15.2 Å) characteristic of Ca-montmorillonite peak and a peak at 29.5° (3.0 Å) due to precipitated $CaCO_3$.

A sample prepared as described above was evaluated and was shown to be active for $SO_2$ removal from a gas mixture. The sample was heated at 5° C./minutes to 900° C. and held at 900° C. for 30 minutes prior to the introduction of 5000 ppm $SO_2$ at 900° C. for 1 hour in flowing air. The $CaCO_3$ decomposes to CaO at 900° C. The conversion was based upon the following reaction:

$CaO + SO_2 + O_2 \rightarrow CaSO_4$ was 74.2% after 1 hour of reaction with 58.9% occurring within the first 5 minutes of reaction (entry S.#1, in Table 1).

A similar procedure was used to produce a 8.9:1 (w/w) $CaCO_3$:Ca-montmorillonite composite (or 5:1 CaO:Ca-montmorillonite) achieved by preparing a 100 ml of 0.2 wt. % suspension of clay in deionized distilled water, adding a 1.0 g quantity of CaO (from the source in Example 1) slowly to the clay suspension while stirring in the open atmosphere, and drying the product in air at ambient temperature. The product, designated sample 2 (S#2, Table 1), was tested for $SO_2$ reactivity at 900° C. in flowing air under the conditions cited above.

After 1 hour of reaction 80.3% of the calcium had reacted with 69.0% of the reaction occurring within the first 5 minutes.

The above method was used to provide a product designated sample 3 (S# 3, Table 1), with a ratio of $CaCO_3$:Ca-montmorillonite of 1.8:1 using 1:1 CaO:Ca-montmorillonite using the above procedure. The sample was tested for $SO_2$ reactivity following the above procedure. Under reaction conditions of example 1, sample 3 gave a total $CaCO_3$ conversion of 74.9% after 1 hour of reaction with 65.5% of the reaction occurring within the first 5 minutes.

The composites isolated in these methods are found by XRPD methods to be rich in $CaCO_3$. By allowing the mixtures to stir longer time durations in water and also drying the slurries formed, in air, initially formed $Ca(OH)_2$ had converted to much more reactive $CaCO_3$.

EXAMPLES 4 and 5

The preparation of $Ca(OH)_2$/$CaCO_3$-Ca-montmorollonite composites with varying base:clay ratios are described in these examples.

The procedure is similar to Example 1. To a stirred 100 ml aqueous clay slurry containing 1.8 g of Ca-montmorillonite (1.8% w/w clay slurry), 5.4 g Mississippi lime was added. The mixture was stirred at room temperature for further 3 hours and filtered through a fine porosity filter paper under vacuum using a buchner funnel. The filter cake was dried in an oven for 6 hours at 110° C.

XRPD of the isolated product showed the composite consists of mainly $Ca(OH)_2$ and small amounts of $CaCO_3$.

The sample was tested for $SO_2$ reactivity following the above procedure. Under reaction conditions of example 1, sample 4 gave a total conversion of 78.5% Ca sites to $CaSO_4$ after 1 hour of reaction with 61.0% of the reaction occurring within the first 5 minutes (S# 4, Table 1).

Using a similar procedure of above, the composite, 3:1 CaO:Ca-montmorillonte was prepared using a 5% w/w Ca-montmorillonite slurry instead of 1.8% w/w. The product was isolated as above and XRPD results showed that composite contained predominantly $Ca(OH)_2$ and small amounts of $CaCO_3$. The sample was tested for $SO_2$ reactivity following the above procedure and gave a total CaO conversion of 75.6% after 1 hour of reaction with 52.3% of the reaction occurring within the first 5 minutes (S# 5, Table 1).

The composite prepared using 1.8% w/w clay slurry showed enhanced $SO_x$ reactivity than the composite prepared using 5% w/w clay slurry. Much diluted clay slurries facilitate the proper dispersion of base particles within the clay platelets and hence show higher $SO_x$ reactivity.

EXAMPLE 6

The preparation of a $Ca(OH)_2$/Ca-montmorillonite clay composite using a $Ca(OH)_2$ as the base precursor is described in this example.

Example 6 provided a product, designated sample 6, that was prepared utilizing the procedures of Example 2. However, $Ca(OH)_2$ from Columbus Chemical Industries, Inc., Columbus, Wis. was used as the $CaCO_3$ precursor instead of CaO. The ratio of $CaCO_3$:Ca-montmorillonite was 4.0:1 after preparation. Sample 4 was tested for $SO_2$ uptake following the procedure cited in Example 1. Sample 6 (S# 6, Table 1) exhibited a total $CaCO_3$ conversion of 75.9% after 1 hour of reaction with $SO_2$ with 61.9% occurring within the first 5 minutes.

The $SO_x$ reactivity of this compound is comparable to the reactivities observed for the composites isolated according to Examples 1 to 3, demonstrating that $Ca(OH)_2$ can be replaced for CaO in preparing $CaCO_3$ containing clay composites.

EXAMPLE 7

The preparation of $CaCO_3$/Na-montmorillonite composite is described in this procedure.

Example 7 provided a product, designated sample 7, that was prepared utilizing the procedures of Example 2, except that Na-montmorillonite from Crook County, Wyo., USA was used in place of Ca-montmorillonite. A ratio of 5.4:1 of $CaCO_3$:Na-montmorillonite was achieved by using 3:1 CaO:Na-montmorillonite. This sample 7 exhibited a total $CaCO_3$ conversion of 78.6% after 1 hour of reaction with $SO_2$ with 66.3% occurring with the first 5 minutes.

By comparing the $SO_x$ reactivity of this composite with the composite prepared using Ca-montmorillonite with same base to clay ratio (S# 1, Table 1), it is evident that composite containing Na-montmorillonites show improved reactivities.

EXAMPLE 8

The preparation of $Ca(OH)_2$/$CaCO_3$/Na-Montmorillonite is described in this procedure.

Example 8 provided a product, designated sample 8 (S# 8, Table 1), that was prepared utilizing the procedures of Example 4, except that 1.8% w/w slurry of Na-montmorillonite from Crook County, Wyo., USA was used in place of Ca-montmorillonite. A ratio of 3:1 of CaO:Na-montmorillonite was obtained by adding 5.4 g of Mississippi lime, CaO to a stirred clay slurry containing 1.8 g of Na-montmorillonite in 100 ml of water. The resultant slurry was stirred three hours at ambient temperatures and filtered through a fine porosity filter paper under vacuum using a Buchner funnel. The filter cake was dried in an oven for 6 hours at 100° C. The product (S# 8, Table 1) exhibited a total CaO conversion of 72.2% after 1 hour of reaction with $SO_2$ with 53.7% occurring with the first 5 minutes.

The Na-montmorillonite containing composite isolated in this manner were found to be less brittle than the composites formed from Ca-montmorillonite.

EXAMPLES 9 to 11

The preparation of $CaCO_2$/Ca-montmorillonite and $CaCO_3$/Na-montmorillonite by introducing carbon dioxide gas through $Ca(OH)_2$/Clay slurries are described in these examples.

To a stirred 100 ml aqueous clay slurry containing 1.8 g of Ca-montmorillonite (1.8% w/w clay slurry), 5.4 g Mississippi lime was added. The mixture was stirred at room temperature for further 3 hours while bubbling carbon dioxide gas through the solution. XRPD studies of the samples isolated at different time intervals from the above reaction mixture showed that conversion of $Ca(OH)_2$ to $CaCO_3$ had completed after about 30 minutes. The precipitate was filtered through a fine porosity filter paper under vacuum using a Buchner funnel. The filter cake was dried in an oven for 6 hours at 100° C.

XRPD of the isolated product showed the composite consists of mainly $CaCO_3$ and small amounts of Ca- (OH)$_2$. This sample 9 exhibited a total CaO conversion of 84.2% after 1 hour of reaction with SO$_2$ with 61.5% occurring with the first 5 minutes.

Using a similar procedure 3:1 CaO/Ca montmorillonite composite was prepared using 5% w/w Ca-mont-montmorillonite instead of 1.8% clay slurry. The product isolated (Sample 10, S# 10 in Table 1) exhibited a total CaO conversion of 82.4% after 1 hour of reaction with SO$_2$ with 60.23% occurring with the first 5 minutes.

In another method 1.8% Na-montmorillonite from Crook County, Wyo., USA was used in place of 1.8% Ca-montmorillonite in the above procedure. This sample 11, exhibited total CaO conversion of 78.6% after 1 hour of reaction with SO$_2$ according to the conditions given in example 1 with 68.7% conversion occurring within first 5 minutes.

The composites isolated in this manner, by purging CO$_2$ gas through the Ca(OH)$_2$/Clay slurries found to be rich in CaCO$_3$. Furthermore, they show improved SO$_x$ reactivities than the composites isolated without purging CO$_2$ gas (S# 4, Table 1). Moreover, the composite prepared using 1.8% w/w clay slurries showed enhanced SO$_x$ reactivities, compared to the composites prepared using 5% w/w clay slurries, due to the improved dispersions of base particles over clay supports.

EXAMPLE 12

The preparation of dry physical mixture of CaO/Ca-montmorillonite is described in this example.

A dry physical mixture of CaO and Ca-montmorillonite in a 1:1 weight ratio was prepared by grinding. After preparation the mixture was stored in a sealed vial to limit its exposure to air. Prolonged exposure of CaO to air causes the formation of Ca(OH)$_2$ or CaCO$_3$ indicated by characteristic diffraction lines in the X-ray powder pattern. The preparation was tested for reactivity towards SO$_2$ following the conditions cited in Example 1. The sample designated, sample 12 (S# 12, Table 1), had a total CaO conversion of 40.0% after 1 hour of reaction with SO$_2$ with 25.7% occurring during the first 5 minutes.

The SO$_x$ uptake observed for this dry physical mixture containing 1:1 CaO/Ca-montmorillonite is much lower than that observed for the composite prepared using same compositions (S# 3, Table 1) suggesting that the physical mixtures of clay and base are inferior to the clay/base composites.

EXAMPLE 13

The preparation of dry physical mixture of Ca(OH)$_2$/Ca-montmorillonite is described in this example.

A dry physical mixture of Ca(OH)$_2$ from Columbus Chemical Industries Inc., Columbus, Wis. and Ca-montmorillonite in a weight ratio, 1:1, was prepared by grinding. After preparation the mixture was stored in a sealed vial to limit its exposure to atmospheric CO$_2$. A sample of the preparation, designated sample 13 (S# 13, Table 1), was tested for reactivity towards SO$_2$ following the conditions cited in Example 1. Sample 13 has a total Ca(OH)$_2$ conversion of 53.0% after 1 hour of reaction with SO$_2$ with 32.8% occurring within the first 5 minutes.

As before, this physical mixture also showed low SO$_x$ reactivity compared to clay/base composites.

EXAMPLE 14

In this example a dry physical mixture containing CaO and Clay prepared according to example 12 is exposed to air and water for longer duration of time to provide enough time to react with CO$_2$ from air to form CaCO$_3$.

This sample (S# 14, Table 1) involved the preparation of a paste, using the minimum amount of water to thoroughly wet the sample. The sample was then allowed to air dry at ambient temperature for 16 hours to encourage CaCO$_3$ formation by reaction with atmospheric CO$_2$. An improvement in reactivity towards SO$_2$ was observed for Sample 14, a total conversion of 55.8% was observed after 1 hour of exposure to SO$_2$ with 39.3% occurring within the first 5 minutes.

EXAMPLE 15

The effect of a CO$_2$ atmosphere on a wetted mixture of Ca(OH)$_2$:Ca-montmorillonite, 4:1 for SO$_2$ removal from flue gas was tested in this example.

A dry physical mixture of Ca(OH)$_2$:Ca-montmorillonite, 4:1, was prepared by grinding CaO and Ca-montmorillonite in a mortar and pestle, followed by exposure to moist air. This resulted in the conversion of CaO to Ca(OH)$_2$ as discussed before. A paste was prepared by wetting the mixture with a minimum amount of water to thoroughly wet the sample. CO$_2$ was then blended into the paste for 16 hours at room temperature. The paste was then air dried at approximately 50° C. An XRPD pattern of the preparation indicated a mixture of Ca(OH)$_2$ and CaCO$_3$ was present with Ca(OH)$_2$ being the dominant species. Decomposition of the two species using thermal gravimetric analysis indicated that 85% of the calcium was present initially as Ca(OH)$_2$. A total conversion of 80.6% was observed after 1 hour of exposure to SO$_2$ with 50.7% occurring within the first 5 minutes (S# 15, Table 1), following the procedure cited in Example 1.

EXAMPLE 16

A dry physical mixture of CaO:Ca-montmorillonite, 3:1, was prepared by grinding CaO and Ca-montmorillonite in a mortar and pestle. A wet paste was prepared from the mixture immediately following grinding. CO$_2$ was passed through the slurry for 20 hours at 80° C. The paste was then air dried at approximately 50° C. An XRPD pattern of the preparation indicated a mixture of Ca(OH)$_2$ and CaCO$_3$ was present with CaCO$_3$ being the dominant species. A total conversion of 73.4% was observed after 1 hour or exposure to SO$_2$ with 53.4% occurring within the first 5 minutes, following the procedure cited in Example 1.

By comparing the SO$_x$ reactivity data for the composites isolated in Examples 15 and 16, it is evident that improved SO$_x$ reactivities are obtained when the dry physical mixtures (from Examples 12 and 13) were treated with water to convert CaO to Ca(OH)$_2$ and dispersed over clay.

TABLE 1

Activity Base/Clay Composites For Removal of $SO_2$ from a Gas Stream[a].

| S. # | Medium Used | Precursor | Base/Clay | Base/Clay Wt. Ratio | % Conversion[b] 5 min. | % Conversion[b] 60 min. |
|---|---|---|---|---|---|---|
| 1 | water suspension | CaO (air) | $CaCO_3$/Ca-mont. (0.25%)[e] | 5.4:1 | 58.9 | 74.2 |
| 2 | water suspension | CaO (air) | $CaCO_3$/Ca-mont. (0.2%) | 8.9:1 | 69.0 | 80.3 |
| 3 | water suspension | CaO (air) | $CaCO_3$/Ca-mont. (0.2%) | 1.8:1 | 65.5 | 74.9 |
| 4 | water suspension | CaO (air) | $CaCO_3/Ca(OH)_2$ Ca-mont. (1.8%) | 3:1[c] | 61.0 | 78.5 |
| 5 | water suspension | CaO (air) | $CaCO_3/Ca(OH)_2$ Ca-mont. (5%) | 3:1[c] | 52.3 | 75.6 |
| 6 | water suspension | $Ca(OH)_2$ (air) | $CaCO_3$/Ca-mont. (0.2%) | 4.0:1 | 61.9 | 75.9 |
| 7 | water suspension | CaO (air) | $CaCO_3$/Na-mont. (0.2%) | 5.4:1 | 66.3 | 78.6 |
| 8 | water suspension | CaO (air) | $CaCO_3/Ca(OH)_2$ Na-mont. (1.8%) | 3:1[c] | 53.7 | 72.2 |
| 9 | water suspension | CaO ($CO_2$ purge) | $CaCO_3$/Ca-mont. (1.8%) | 3:1[c] | 61.5 | 84.2 |
| 10 | water suspension | CaO ($CO_2$ purge) | $CaCO_3$/Ca-mont. (5%) | 3:1[c] | 60.2 | 82.4 |
| 11 | water suspension | CaO ($CO_2$ purge) | $CaCO_3$/Na-mont. (1.8%) | 3:1[c] | 68.7 | 78.6 |
| 12 | dry blend | CaO | CaO/Ca-mont. | 1.0:1 | 25.7 | 40.0 |
| 13 | dry blend | $Ca(OH)_2$ | $Ca(OH)_2$/mont. | 1.0:1 | 32.8 | 53.0 |
| 14 | paste | CaO | $(Ca(OH)_2/CaCO_3$/Ca-mont. | 1.0:1[c] | 39.3 | 55.8 |
| 15 | paste | $Ca(OH)_2$ | $(Ca(OH)_2/CaCO_3)$/Ca-mont. | 4.0:1[c] | 50.7 | 80.6 |
| 16 | paste | CaO | $(Ca(OH)_2/CaCO_3)$/Ca-mont | 3.0:1[c] | 53.4 | 73.4 |
| 17 | | CaO | | | 14.6 | 43.7 |
| 18 | | $CaCO_3$[d] | | | 31.2 | 31.8 |

[a]At 900° C.; 5000 ppm $SO_2$.
[b]$CaO + SO_2 + O_2 \rightarrow CaSO_4$.
[c]Precursor/clay ratio.
[d]$CaO + 2CH_3COOH \rightarrow Ca(CH_3COO)_2 + H_2O$  $Ca(CH_3COO)_2 + Na_2CO_3 \rightarrow CaCO_3 + 2NaOOCCH_3$.
[e]Conc. of clay slurry % w/w.

It is intended that the foregoing description be only illustrative and that the present invention be limited only by the hereinafter appended claims.

We claim:

1. A method for preparing a composite material useful for $SO_x$ removal from the flue gas of a coal-burning power plant and other gas streams which comprises:
   (a) providing a suspension of a smectite clay containing 0.1 to 5% by weight of clay in water;
   (b) adding a basic material selected from the group consisting of alkaline earth metal oxides and hydroxides to the clay suspension to provide a resulting suspension;
   (c) mixing the resulting suspension;
   (d) recovering a precipitate from the resulting suspension; and
   (e) drying the precipitate at a temperature between 100°–120° C. to provide the composite material, wherein when the composite material is heated to a temperature of 500° C. or above, the $SO_x$ components from a gas stream are removed by the composite material upon contacting with the said gas stream at that temperature.

2. The method of claim 1 wherein the weight ratio of the basic material to clay in the composite material is between 1:1 and 10:1.

3. A method in accordance with claim 1 wherein the composite material is dried as a cake, crushed, and then sieved to separate desired mesh size ranges.

4. A method in accordance with claim 1 wherein the smectite clay is selected from the group consisting of montmorillonite, fluorohectorite, bentonite, nontronite, hectorite, saponite, and beidellite, preferably in $Na^+$ exchanged form.

5. A method in accordance with claim 1 wherein the alkaline earth metal is selected from the group consisting of magnesium and calcium.

6. A method in accordance with claim 1 wherein the composite material is substantially in $Ca(OH)_2$ with minor amounts of $CaCO_3$ as the basic material.

7. A method for preparing a composite material useful for $SO_x$ removal from the flue gas of a coal-burning power plant and other gas streams which comprises:
   (a) providing a suspension of a smectite clay containing 0.1 to 5% by weight of clay in water;
   (b) adding a basic material selected from the group consisting of alkaline earth metal oxides and hydroxides to the clay suspension to provide a resulting suspension;
   (c) mixing the resulting suspension by stirring with $CO_2$ gas present in water to convert at least some of the basic material to alkaline metal carbonate;

(d) recovering a precipitate from the resulting suspension; and
(e) drying the precipitate in air at ambient temperatures to provide the composite material, wherein when the composite material is heated to a temperature of 500° C. or above, the $SO_x$ components from a gas stream are removed by the composite material upon contacting with the said gas stream at that temperature.

8. The method of claim 7 wherein basic weight ratio of the basic material to clay in the composite material is between 1:1 and 10:1.

9. A method in accordance with claim 7 wherein the composite mateiral is dried in a cake, crushed, and then sieved to separate desired mesh size ranges.

10. A method in accordance with claim 7 wherein the smectite clay is selected from the group consisting of montmorillonite, fluorohectorite, bentonite, nontronite, hectorite, saponite, and beidellite, preferably $Na^+$ exchange form.

11. A method in accordance with claim 7 wherein the alkaline earth metal is selected from the group consisting of magnesium and calcium.

12. A method in accordance with claim 7 wherein the composite material is substantially $CaCO_3$ with minor amounts of $Ca(OH)_2$ as the basic material.

13. A method for preparing a composite material useful for $SO_x$ removal from the flue gas of a coal-burning power plant and other gas streams which comprises:
   (a) providing a suspension of a smectite clay containing 0.1 to 5% by weight of clay in water;
   (b) adding a basic material seelcted from the group consisting of alkaline earth metal oxides and hydroxides to the clay suspension as a resulting suspension;
   (c) mixing the resulting suspension by stirring while bubbling $CO_2$ gas through the suspension to convert at least some of the basic material to alkaline metal carbonate in the resulting suspension;
   (d) recovering a precipitate from the water by filtration or by centrifugation; and
   (e) drying the precipitate in air at ambient temperatures or in an oven at 110° C. to prvoide the composite material, wherein when the composite material is heated to a temperature of 500° C. or above, the $SO_x$ components from a gas stream are removed by the composite material upon contacting with the said gas stream at that temperature.

14. The method of claim 13 wherein the basic compound weight ratio of basic material to clay in the composite is between 1:1 and 10:1.

15. A method in accordance with claim 13 wherein the composite material is dried in a cake, crushed, and then sieved to separate the desired mesh sizes.

16. A method in accordance with claim 13 wherein the smectite clay is selected from the group consisting of montmorillonite, fluorohectorite, bentonite, nontronite, hectorite, saponite, and beidellite, preferably in $Na^+$ exchange form.

17. A method in accordance with claim 13 wherein the alkaline earth metal is selected from the group consisting of magnesium and calcium.

18. A method in accordance with claim 13 wherein the composite is substantially in calcium carbonate with minor amounts of calcium hydroxide as the basic material.

* * * * *